(12) United States Patent
Kim et al.

(10) Patent No.: US 12,047,335 B1
(45) Date of Patent: Jul. 23, 2024

(54) SYSTEMS AND METHODS FOR MANAGING BOT-GENERATED INTERACTIONS

(71) Applicant: Medallia, Inc., San Francisco, CA (US)

(72) Inventors: Mansu Kim, San Jose, CA (US); Benjamin Chokchai Markines, Sunnyvale, CA (US); Sudheer Banu Chittireddy, Cupertino, CA (US)

(73) Assignee: Medallia, Inc, San Francisco, CA (US)

( * ) Notice: Subject to any disclaimer, the term of this patent is extended or adjusted under 35 U.S.C. 154(b) by 0 days.

(21) Appl. No.: 18/224,925

(22) Filed: Jul. 21, 2023

Related U.S. Application Data

(62) Division of application No. 16/689,514, filed on Nov. 20, 2019, now Pat. No. 11,711,323.

(51) Int. Cl.
*G06F 15/16* (2006.01)
*H04L 51/02* (2022.01)

(52) U.S. Cl.
CPC .................................... *H04L 51/02* (2013.01)

(58) Field of Classification Search
CPC ............................. H04L 51/02; H04L 65/1079
USPC ........................................................ 709/206
See application file for complete search history.

(56) References Cited

U.S. PATENT DOCUMENTS

| | | | |
|---|---|---|---|
| 8,402,099 B2* | 3/2013 | Von Werther | H04L 67/306 709/204 |
| 2017/0070522 A1* | 3/2017 | Bailey | H04L 41/20 |
| 2020/0067861 A1* | 2/2020 | Leddy | G06F 21/6245 |
| 2020/0184959 A1* | 6/2020 | Yasa | G06F 16/334 |
| 2020/0403945 A1* | 12/2020 | Boxwell | G06N 3/004 |

* cited by examiner

*Primary Examiner* — Alan S Chou (57) ABSTRACT

Embodiments discussed herein refer to systems and methods for chatbot interactions. When chatbot derived interactions are detected, the system can prevent those interactions from being further processed. This can be performed by an analysis system operative to engage in a dialog with customers. The system can manage a dialog with a first customer and evaluate the dialog to determine whether any interactions or responses are associated with a chatbot or a human. Interactions or responses determined be associated with a chatbot are dropped and not permitted to be further processed by the analysis system.

12 Claims, 8 Drawing Sheets

SYSTEMS AND METHODS FOR MANAGING BOT-GENERATED INTERACTIONS

RELATED APPLICATIONS

The instant application is a Divisional Patent Application and claims the benefit and priority to the U.S. patent application Ser. No. 16/689,514 filed on Nov. 20, 2019, which is incorporated herein by reference in its entirety.

FIELD

The present disclosure relates to content analysis, including analysis of feedback, and more particularly to systems and methods for managing chatbot interactions.

BACKGROUND

With the advancement of the computer and network technologies, various operations performed by users from different applications lead to extensive use of web services, instant messengers, text messaging, and web-based chat. This proliferation of the Internet and Internet based user activity continues to create a vast amount of digital content. For example, multiple users may interact with services that enable users to perform various actions (e.g., place requests for information, request for an action to take place, respond to surveys, provide social media reviews, access customer support, and express opinions during an interaction) in connection with a business entity, a business brand, product, company (e.g., the corporate parent, branch, or subsidiary of a hotel, restaurant, airline, financial institution, or a restaurant) or organization unit (e.g. team) or employee (e.g. CEO, Manager) via different applications, such as mobile applications running on different platforms, instant messengers, text messaging, smart speakers, video with smart speakers as well as web-interfaces running on different browsers in different operating systems. Furthermore, users may also use different social media outlets to post their feedback about the business entity or company.

Systems exist that invite individuals or systems to interact with a platform to provide content (e.g., feedback) or instructions (e.g., request for actions to be implemented), acquire the content and instructions, and provide metrics indicative of the user interactions using computerized analytics techniques. Any non-human generated interactions may be referred to herein as bot-generated interactions. Bot-generated interactions can be generated from any computer instrument or computer program. These computer instruments and programs may be referred to herein as chatbots. Chatbots can use any method from text, instant messaging, voice or photo to interact with the system. An adversarial chatbot may be designed with the purpose of damaging the business brand, the interaction system and/or the product's reputation. Adversarial chatbots are also referred to herein as chatbots.

Businesses can provide automated feedback solicitation experiences to obtain specific feedback, and metrics indicative of the feedback, in response to a query. Businesses can use the feedback and metrics to make business decisions. Systems exist to receive and process signals from various sources that may or may not include feedback, and can trigger a chat (e.g., such as a chatbox) with a user. Businesses can provide these chat conversations with bots or live agents to allow users to solicit information or request actions to take place during an experience or event. Chatbots can be used engage in these chat conversations and is desirable to detect when chatbots are generating responses (as opposed to humans) and manage the chatbot derived responses accordingly. For example, businesses may also provide concierge services in which the business can provide automated services to users that are actively engaged in an experience (e.g., buying a product, checking in with a hotel or airline, perusing a brick and mortar store, etc.). Users can interact with the concierge service by providing text inputs or voice inputs and the business can analyze the inputs to execute actions in response thereto or to perform analytics. In order to preserve the integrity of the feedback or interactions with the services, and the metrics obtained therefrom, the system must protect itself from abuse. One type of entity that can abuse the system, by pretending to provide legitimate feedback or interactions to the system, can include chatbots. Chatbots can be designed to engage in conversations that emulate a human participant. Chatbot generated responses may introduce multiple negative side effects in the context of feedback acquisition systems and concierge systems. One negative aspect of chatbots is that they are not human, and as a result, any interactions provided by a chatbot requires the system to service non-human entities. In addition, chatbots may generate responses at a rate that overloads the feedback acquisition system. This results in an unnecessary waste of system resources, including data center costs and carrier delivery costs, to process chatbot derived interactions. Furthermore, chatbots can use a transport layer (e.g. SMS text messages charge per inbound and outbound messages) that can result in high cost to the system operation. Another negative side effect of chatbots is the collection of data from non-human entities that skew the data, thus causing inaccurate metrics. Yet another negative of chatbots is that they can be used to attack a system, for example, by inundating it with responses to cause the system to crash or result in a denial of service for legitimate responders. In addition, chatbot attacks can diminish legitimate responders' experience.

Therefore, in view of the foregoing, systems and methods for managing chatbot derived feedback and chatbot driven user interactions are needed.

SUMMARY

The following presents a simplified summary of one or more examples to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

Embodiments discussed herein refer to systems and methods for managing chatbot interactions. When chatbot derived interactions are detected, the system can prevent those interactions from being further processed. This can be performed by an analysis system operative to engage in a dialog with customers. The system can manage a dialog with a first customer and evaluate the dialog to determine whether any interactions or responses are associated with a chatbot or a human. Interactions or responses determined be associated with a chatbot are dropped and not permitted to be further processed by the analysis system.

In one embodiment, a system is provided that can include an analysis system operative to engage in a dialog with a plurality of customers via a network, wherein the dialog comprises at least one question or a statement and an user response to each of the at least one question, and wherein the dialog is presented as a conversation thread. The analysis system can include a dialog module operative for managing a dialog with each of the customers, and a bot management module operative to manage interactive content based on a determination of whether received interactive content is associated with a chatbot or a human, wherein interactive content determined be associated with a chatbot is dropped and not permitted to be further processed by the analysis system, and wherein interactive content determined to be associated with a human is further processed by the analysis system.

In another embodiment, a computer-implemented method for preventing chatbot derived interactive content from being processed by an analysis system is provided to include receiving interactive content from a customer as part of a dialog, wherein the dialog comprises at least one question and an answer to each of the at least one question, and wherein the dialog is presented as a conversation thread, assigning an address to the customer if an address is not already assigned to the customer, dropping the received interactive content if the address is on a blacklist registry or a blocklist registry, obtaining a response rate of the received interactive content if the address is not on the blocklist registry, enabling further processing of the received interactive content if the response rate is greater than a response rate threshold. If the response rate is less than the response rate threshold, placing the address in the blacklist registry if a response rate counter associated with the address is greater than a count threshold, placing the address in the blocklist registry if the response rate counter is less than or equal to the count threshold.

In yet another embodiment, a computer-implemented method implemented in an analysis system operative to engage in a dialog with a plurality of customers via a network, wherein the dialog is presented as a conversation thread, is provided. The method can include managing a dialog with a first customer, wherein the dialog comprises first interactive content provided by the first customer, and evaluating the first interactive content to determine whether the first interactive content is associated with a chatbot or a human, wherein interactive content determined be associated with a chatbot is dropped and not permitted to be further processed by the analysis system, and wherein interactive content determined to be associated with a human is further processed by the analysis system.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Embodiments discussed herein are directed to systems and methods for managing chatbot interactions. The managing can include the detection of chatbot derived interactions and preventing chatbot derived interactions from affecting a system that is processing those interactions, for example, by preventing the chatbot derived interactions from being analyzed or being further processed by the system. A bot detection module or software layer can be used to assess whether interactions from a particular customer is associated with a chatbot and prevent any interactions from that chatbot from being passed on to other parts of the system. In effect, the bot detection module can serve as a defensive barrier to the negative aspect of chatbots as discussed above (e.g., preventing the servicing of non-human entities, eliminating unnecessary waste of system resources, including data center costs and carrier delivery costs, to process chatbot derived interactions, eliminating data skew by preventing collection of data from non-human entities, and preventing attacks on the system).

User interactions with various systems used herein can provide content (e.g., feedback such as opinions, complaints, or praise, request for additional information or help) or instructions (e.g., request for actions to be implemented) to the system. In some embodiments, the user interactions operate in a dialog space where an analysis system engages a customer in a dialog. The dialog can include one or more questions that are posited by a business to the customer, or alternatively, the dialog can start with the customer asking for assistance and the system will provide follow up questions. The customer answers those one or more questions by typing in (e.g., text input) or voice dictating (e.g., voice input) a response. These responses are transmitted to and analyzed by the analysis system. If there are multiple questions in the dialog, a subsequent question presented to the customer may depend on a prior answer.

In other embodiments, the user interaction can be a response to a system initiated inquiry or notice to assist the user. For example, the user interaction can be a concierge type of dialog where a live agent or chat bot agent engages in a conversation with the user. The concierge type of dialog is different than a survey or solicitation scenario, yet is still potentially susceptible to chatbot abuse. In yet another embodiment, the user interaction can be user initiated. For example, the user can open an application on his or her phone and engage in a dialog with a business or provide instructions to the business. As another example, a user can send a text to a specific business number to initiate a dialog with the business.

The conversation between the customer and the business is a real-time dialog and can be implemented using any number of suitable communications platforms or channels. The dialog is designed to be user friendly and easily accessible. As a result, the customer is not required to verify that he or she is actually a person by performing some sort of verification prior to engaging in the dialog. Examples of verification include interacting with Recaptcha™ software, accessing a link through another channel (e.g. Email, sms/text message), performing picture selection, etc. Providing the dialog interface in the user friendly manner—without requiring prior verification of a human user—opens the dialog to potential chatbot abuse. The dialog is presented as a conversation thread in which the customer and the feedback analysis system engage in a real-time or near real-time conversation. Embodiments discussed herein address the potential for chatbot abuse by managing chatbot messaging interactions or feedback.

As defined herein, a chatbot or bot refers to artificial intelligence software that engages in human emulated conversation using natural language through various channels such as messaging applications, websites, mobile apps, or a telephone.

In the embodiments described herein, interactive content can include "feedback," which can refer to a description, criticism, or praise regarding an interaction a customer or employee had with a business, product, or service. In some embodiments described herein, the feedback can be customer responses to a dialog. In some embodiments described herein, the feedback may consist of a review of a business, product or service. In other embodiments, the feedback may be a description of an experience, that the user had with a particular business, including that business' products, services, or other offerings. In yet other embodiments, the feedback may be a description of an experience an employee had with their employer (such as an experience with their manager). Throughout this patent application, the feedback may be directed at a business entity or company (e.g., the corporate parent, branch, or subsidiary of a hotel, restaurant, airline, financial institution, or a restaurant), and the terms 'company' and 'business entity' may be used interchangeably. Throughout this patent application, the role of a 'customer' may be replaced by an employee. In some embodiments, feedback may be received from both employees and customers.

In some embodiments, interactive content may represent any messaging interaction or response received from a computing device—human operated or chatbot operated—in connection with a dialog being serviced by a system capable of managing and analyzing the dialog. For example, a user may enter a store and open an application provided by the business operating the store. Using the application, the user can start a dialog with an agent of the business (e.g., a live agent or a chatbot agent). The user can ask questions or submit requests in the dialog and the agent can respond and ask follow up questions. Alternatively, a user may engage in an action at a store and the business may initiate a dialog via an application on the user's phone in response to the action.

Chatbot derived interactive content includes any of the aforementioned interactive content, but is generated by a chatbot and not a human operator.

As defined herein, a client refers to users that subscribe to services provided by the feedback system. The users are typically employees, agents, or executives of a business who interact with client portals that provide several different views that enables users to assess interactive content being provided by customers. Embodiments discussed herein provide client portal views that correlate events and feedback.

Customers can provide interactive content using a variety of different platforms. For example, customers can respond to surveys that are pushed out from an analysis service. As another example, customers can interact with a virtual assistant platform or other voice recognition platform to access an interactive content service that enables customers or employees to provide interactive content to or have a conversation with any company about their business, product or service. The service can be accessed at any time using a mobile phone or internet connected speaker device using a digital assistant platform such as via Alexa, Google Assistant, and Siri. This enables customers to provide "in the moment" interactive content about a business, product or service associated with a particular business, including a business at a particular location. For example, the customer can say "Talk to Medallia Service" using the digital assistant platform to initiate an interactive content session. The interactive content service may engage the customer in a dialog to obtain information pertaining to the business name, business address, and the customer's interactive content.

The analysis service can leverage analytics modeling engines and sentiment analysis modeling engines to evaluate the text strings (or voice-to-text strings) supplied by the customer as part of his or her interactive content. The sentiment analysis modeling engines can include a universal sentiment analysis modeling engine and client specific sentiment analysis modeling engines for assessing sentiment in the text strings.

In some embodiments, the system may initiate a chat session in response to detected user interactions such as an on-going interaction, a completed interaction, or occurrence of an event that affected the user. These chat sessions may not be feedback solicitation per se, but may provide an opportunity for the customer to engage with the business in connection with the interaction or event. For example, these chat sessions can interact with users who have questions or need service when they are on-site at a customer property or a store, or are first engaging with a business (such as checking in). These chatbots provide 'personal engagement' with a business, rather than being focused on gathering feedback.

Figure 1:
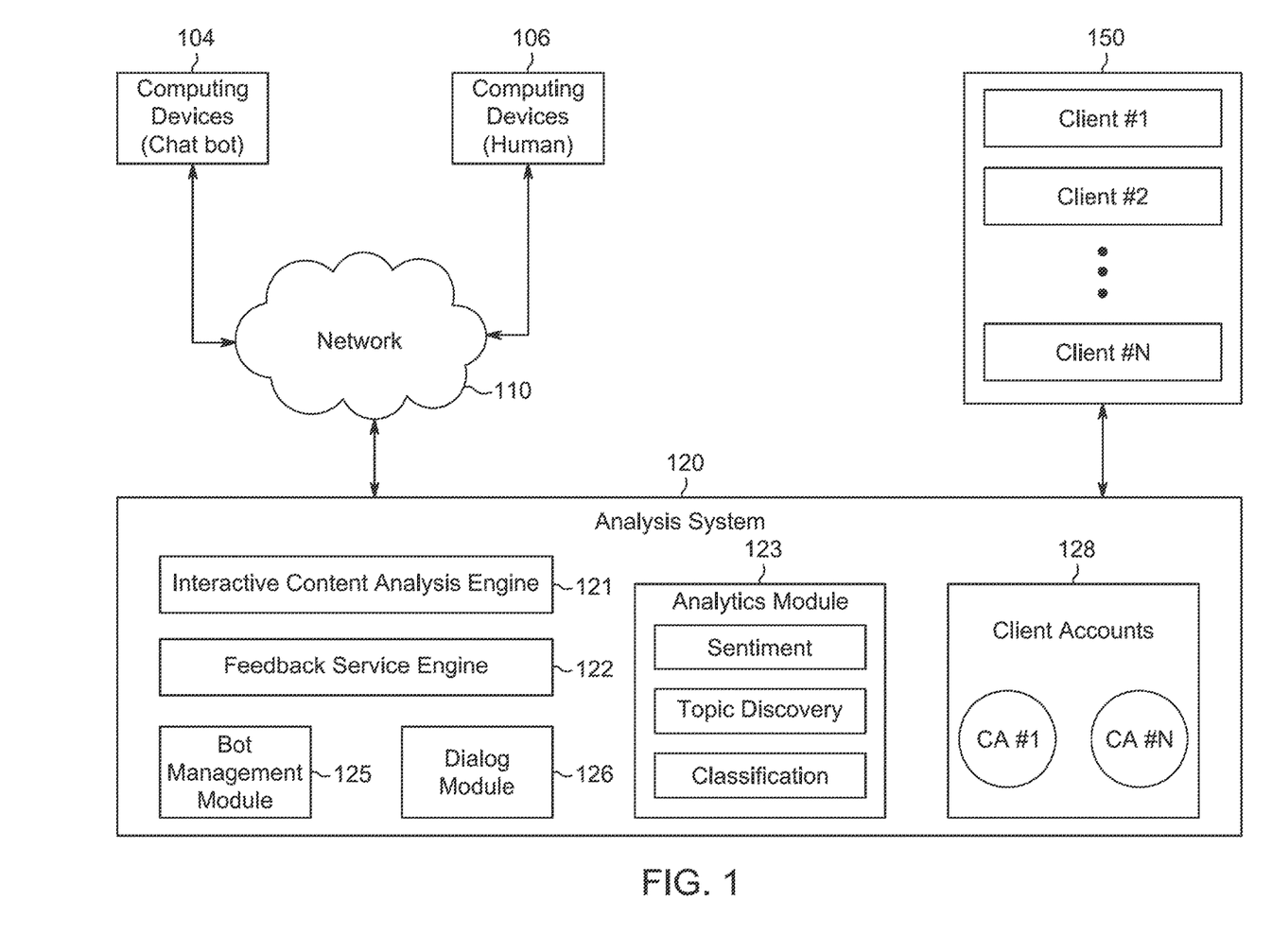
FIG. 1 shows an illustrative block diagram of a system according to an embodiment.

FIG. 1 shows an illustrative block diagram of a system according to an embodiment. The system can include chatbot operated computing devices 104 and human operated computing devices 106, network 110, analysis system 120, and clients 150. Computing devices 104 and 106 can be any suitable electronic device capable of engaging in a dialog with analysis system 120 via network 110. Computing devices 104 and 106 can include desktop computers, laptops, mobile devices such as smartphones, servers, tablets, an accessory such as a watch, glasses, other wearables, smart speakers, smart video, etc. Some of these devices can run virtual assistant platform such as Siri, Alexa, Google Assistant, or other application capable of processing speech. The virtual assistant platform may be capable of understanding speech spoken by the user of customer device and provide text strings to analysis system 120 for further processing. In case of smart video case, on top of audio based virtual assistant capability, it can use video as feedback inputs. Network 110 can include any suitable network for transmitting data from one location to another. For example, the network can include the Internet, wide area networks, local area networks, telephony data transmissions, WiFi, etc. A chatbot or a human can interact with their respective devices to provide feedback, for example, as part of a dialog to analysis system 120.

Analysis system 120 can include one or more servers and databases for running feedback service engine 122, analytics module 123, interactive content analysis engine 121, bot management module 125, dialog module 126, and for maintaining client accounts 128. Interactive content engine 124 may access modules 122, 123, 125, 126 and 128 to generate client specific portals (based on interactive content) that enable clients to evaluate the interactive content. Analytics module 123 can access one or more of a sentiment model, a topic discovery model, and classification model to evaluate text strings received from customers. The analysis of the text strings can enable feedback service engine 122 to quickly and accurately classify the interactive content and generate the appropriate data set for inclusion with client accounts 128. Analytics module 123 may be responsible for determining sentiment (e.g., whether customer is happy, sad, annoyed, pissed off, pleasantly surprised, etc.) in feedback. Analytics module 123 may be responsible for quantitative data (e.g., number of feedback submissions, frequency of feedback submissions, the time of submissions, etc.) relating to feedback.

Interactive content analysis engine 121 may be responsible for processing content received from various computing devices and can be used to monitor customer interactions at all or various points in the customer's journey with the business product or service. Interactive content analysis engine 121 can process the content being received from various sources and determine when to initiate a chat conversation, or determine that a user is having a chat conversation with a chatbot or live agent. For example, the content can include an indication that a user experience is currently active (e.g., browsing for products on a particular website) or has been completed (e.g., completed a web check, a flight, a car rental, or conversation with a person). As another example, the content can also indicate the occurrence of an event (e.g., that the event has been cancelled, a user switched hotel rooms, or received an upgrade on a flight). As another example, the content can indicate that the user is currently having a chat conversation with a chatbot or live agent that does not involve feedback—such as the user has asked in a chat conversation whether they can extend their checkout time, reserve an additional night in their hotel room, or is asking for factual details about the operation of a hotel property (when the pool closes, when a restaurant is open, etc). Interactive content based analysis and chats initiated in response thereto can potentially interact with chatbots. Analytics module 123, bot management module 125, and dialog module 126 may be leveraged to assess whether a chatbot is engaged in the chat.

Bot management module 125 may be responsible for determining whether any interactive content being received from computing devices 104 and 106 is associated with a chatbot. Bot management module 125 can serve as a defense mechanism for preventing chatbot derived interactive content from inundating feedback analysis system 120 by determining whether a customer is associated with known chatbots or exhibits characteristics indicative of chatbots.

Dialog module 126 may include client specific questions or survey that are presented to customers. Depending on the client, the dialog can include any number of questions ranging from one to many questions. In addition, follow up questions can depend on prior answers to questions. Embodiments discussed herein ensure that humans are participants in the dialog and not chatbots.

Client accounts 128 refer to accounts maintained for clients that pay to access analysis system 120. Clients 150 may represent different paying clients that have accounts with analysis system 120 and prospective clients. Paying clients can access their respective accounts in client accounts 128. Clients 150 may access client portals to view feedback and other analytics generated by analysis system 120. For example, clients 150 may define or customize views they wish to see.

Although not explicitly shown in FIG. 1, system 120 can be run on one or more servers, and have one or more databases for storing data. System 120 may also have input devices such as keyboards, mice, and microphones and output devices such as monitors, printers, and speakers.

Figure 2:
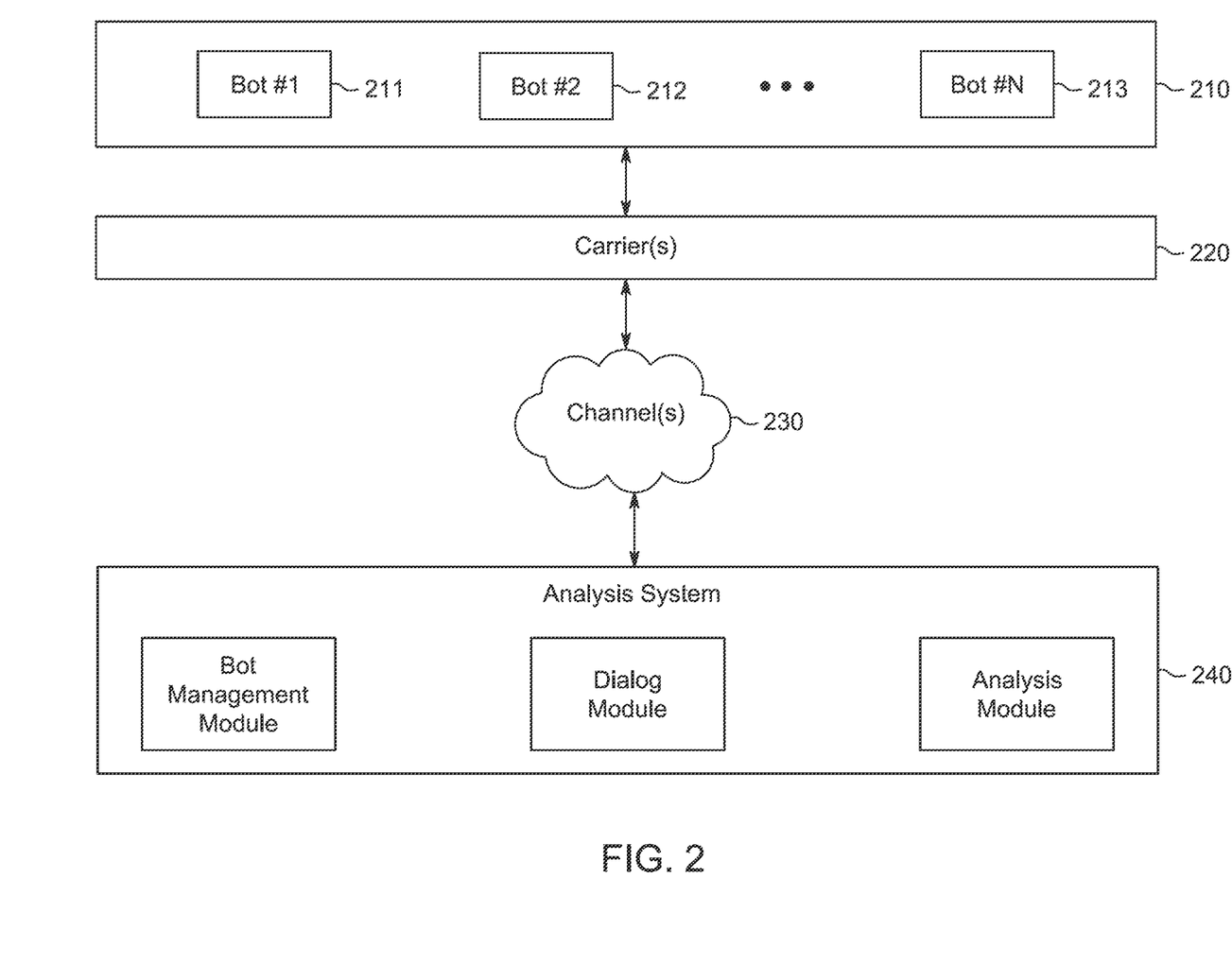
FIG. 2 shows an illustrative block diagram of a framework in which chatbots can communicate with a analysis system according to an embodiment.

FIG. 2 shows an illustrative block diagram of a framework in which chatbots can communicate with a feedback analysis system according to an embodiment. The framework can include chatbots 210, carriers 220, channels 230, and analysis system 240. Chatbots 210 can include any number of bots, shown here as bots 211-213. Each bot may run on a device (not shown) that communicates with analysis system 240 via a particular one of carriers 220 through a particular one of channels 230. Carriers 220 refer to the company responsible for transferring feedback from the bot device to feedback analysis servers. For example, a carrier can be phone company, mobile service provider, or an Internet service provider (ISP). Channels 230 refer to the application layer being leveraged on top of the carrier to interface with the dialog. For example, channels 230 can include specific platforms such as SMS text, WeChat, Facebook chat, Twitter, Slack, or any other platform that allows for dialog communication between the two parties. Analysis system 240 can include bot management module 241, dialog module 242, and analysis module 243, as previously discussed.

Figure 3:
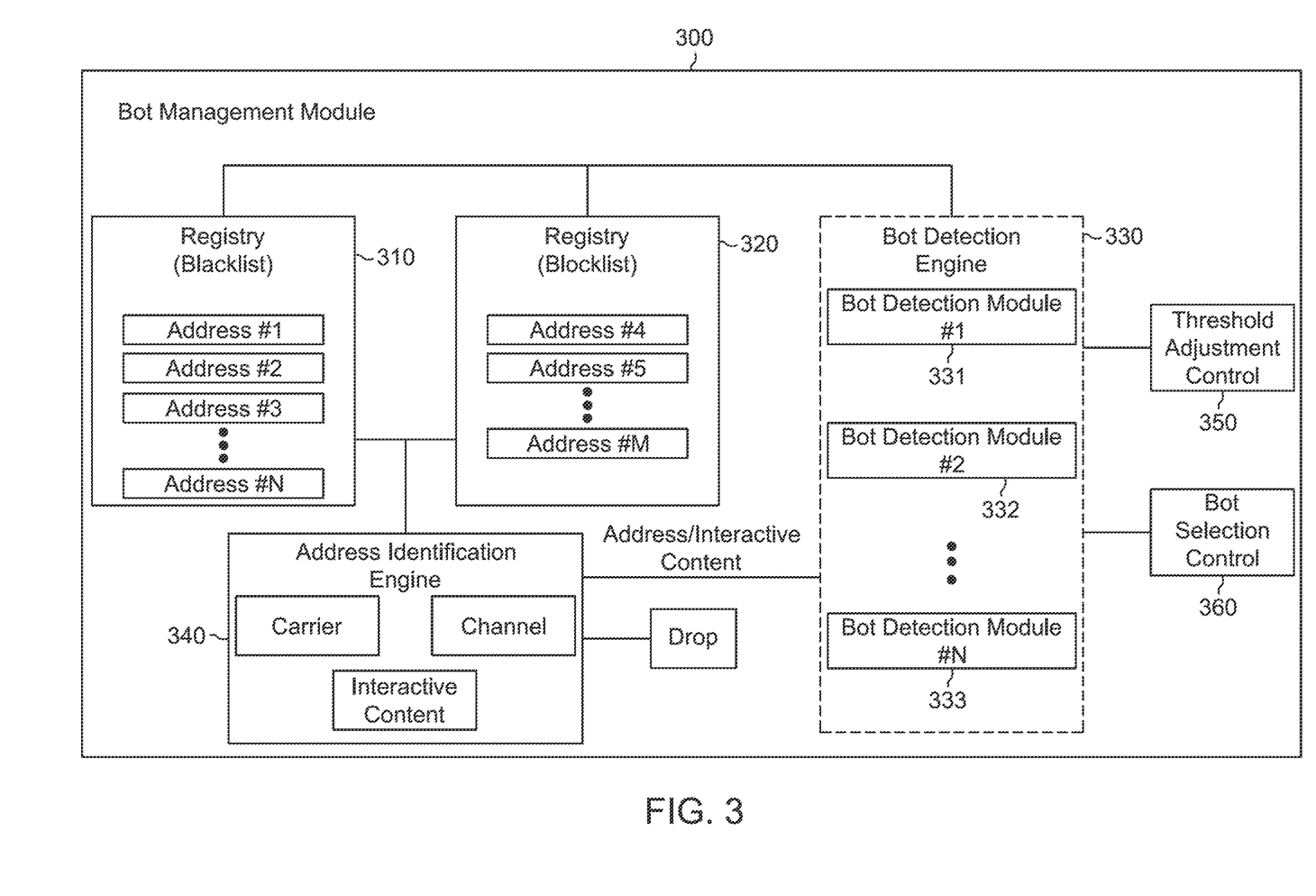
FIG. 3 shows illustrative block diagram of a bot management module according to an embodiment.

FIG. 3 shows illustrative block diagram of bot management module 300 according to an embodiment. Module 300 can include blacklist registry 310, blocklist registry 320, bot detection engine 330, address identification engine 340, threshold adjustment control 350, and bot selection control 360. Blacklist registry 310 can include addresses known to be associated with chatbots. The addresses can be an internal designation for a customer attempting to provide interactive content to the analysis system. Any interactive content received in connection with any address contained in blacklist registry 310 is blocked, filtered, dropped, or deleted and is not allowed to be further processed by the analysis system. Customers having an address stored in blacklist registry 310 may have to petition or request removal from registry 310 by going through the appropriate customer support channels and prove that they are not a chatbot.

Addresses can be added to blacklist registry 310 in a number of different ways. In one embodiment, one of bot detection mechanisms 330 can determine that an address is associated with a chatbot and add that address to registry 310. In another embodiment, users can manually populate registry 310 with addresses known to be associated with chatbots. In yet another embodiment, registry 310 can be populated by an open source registry where clients collaborate to identify known chatbots.

Blocklist registry 320 can include addresses associated with suspected chatbots, but interactive content associated with those addresses has not yet risen to a level that condemns the address to blacklist registry 310. Any interactive content associated with address contained in the blocklist registry 320 is also blocked, filtered, dropped, or deleted and is not allowed to be further processed by the analysis system. Bot detection engine 330 may add an address to blocklist registry 320 if interactive content associated with that address is indicative of a chatbot, but it is not completely determined to be associated with a chatbot. If the interactive content associated with that address continues to exhibit chatbot characteristics, then that address may be added to blacklist registry 310. If the interactive content associated with that address exhibits human response characteristics, then that address may be removed from blocklist registry 320.

Bot detection engine 330 can include one or more different approaches for detecting whether interactive content associated with an address can be associated with a chatbot. Each of these different approaches is represented by a particular bot detection module, shown as modules 331-333. Each one of the modules 331-333 can employ a unique approach for analyzing interactive content and determining whether the interactive content is being generated by a chatbot. When bot detection engine 330 determines that an address is associated with a chatbot, engine 330 may place that address in one of registry 310 or registry 320. If engine 300 determines that the address is not associated with a chatbot, engine 300 may pass the interactive content on to another module within the analysis system such as, for example, a dialog module and/or an analysis module.

Module 331 may be used to identify chatbots based on lookup tables that contain known sources of chatbots. For example, module may store phone numbers, identifications, user IDs, etc. that are known chatbot sources.

Module 332 may identify chatbot based on a response rate to questions. Since humans generally take a minimum amount of time to formulate and enter a response, responses that arrive in less time than the minimum amount of time may be chatbot derived.

Module 333 may detect chatbot based on behavior. The behavior can include a pattern of similar responses. Humans are more likely to have varied responses to the same question, but a chatbot will likely respond in the same manner each time. By detecting these same response patterns, chatbots can be detected across all customers accessing the feedback analysis system. For example, module 333 can be used to detect chatbot utterances or other expressions that are highly indicative of a chatbot responses. When such chatbot utterances or expressions are detected, they can be stored in a database (not shown). Then, module 333 can compare incoming interactive content to the chatbot utterances stored in the database to assess whether the incoming interactive content is associated with a chatbot.

One or more of the modules in bot detection engine may use a machine learning algorithm to assess whether incoming interactive content is associated with a chatbot. Machine learning is a form of big data analytics or artificial intelligence. Machine learning algorithms can be used to perform a specific task (e.g., identify whether feedback is chatbot derived) without using explicit instructions, and instead relies on patterns and inferences. Machine learning algorithms build a mathematical model based on sample data, known as "training data", in order to make predictions or decisions without being explicitly programmed to perform the task. In one embodiment, training data sets may be provided to the bot detection engine and at least one of the machine learning algorithms can be trained using the received training data sets.

In some embodiments, bot management module 300 may provide a user interface that prompts to a human user to specify whether the bot detection engine correctly determined whether the interactive content is associated with a chatbot. The user can provide an indication specifying whether the bot detection engine correctly determined whether the first interactive content is associated with a chatbot. The indication can be incorporated into one of the bot management modules as feedback to the at least one machine learning algorithm.

Threshold adjustment control 350 may be used to adjust threshold for one or more of modules 331-333. For example, an administrator or a client can adjust thresholds for one or more modules 331-333 to result in faster or slower inclusion of addresses into blacklist registry 310 and/or blocklist registry 320.

Bot selection control 360 may be used to select which module or modules within bot detection engine 330 are to be used. Bot selection control 360 may be controlled by an administrator or a client. In some embodiments, bot selection control 360 may be controlled based on other factors such as the client, the type of dialog provided to customers, volume of feedback for a particular client, etc.

Address identification engine 340 is operative to assign an address to a customer interacting with the feedback analysis system. The customer can be a human operator or a chatbot that uses a carrier to convey interactive content over a channel. The address identification engine may cross-check whether an incoming address corresponds to an address contained blacklist registry 310 or blocklist registry 320 and route the feedback to bot detection engine 300 if the address is not contained therein or drop the interactive content if the address is contained therein. If the interactive content is not associated with an address contained registries 310 or 320, the feedback and any other information (e.g., carrier and channel) are provided bot detection engine 330 for analysis. The interactive content can include content as well as additional identifying information such as a time stamp. Some of modules 331-333 may use different information to assess whether the interactive content is associated with a chatbot. If the interactive content is associated with a blacklist or blocklist address, address engine 340 can drop that interactive content and prevent it from adversely affecting the analysis system.

Figure 4:
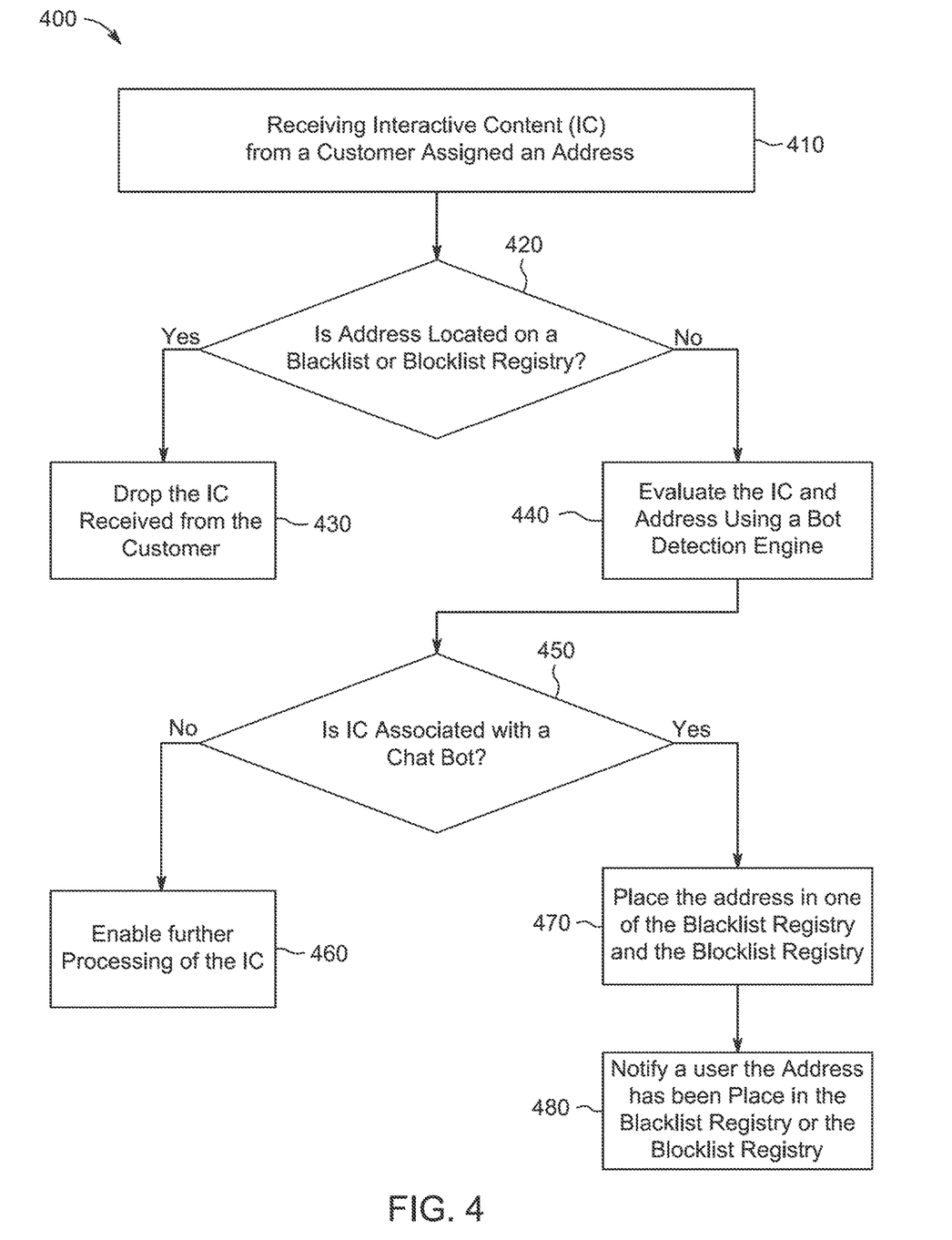
FIG. 4 shows an illustrative process for managing chatbot derived interactive content according to an embodiment.

FIG. 4 shows illustrative process 400 for managing chatbot derived feedback according to an embodiment. Process 400 may be implemented using a analysis system (as discussed in connection with FIGS. 1 and 2) and a bot management module (as discussed in connection with FIG. 3). Process 400 is used in connection with a dialog exchange between a customer and the analysis system, where the customer uses a "middle man" channel and carrier to convey and receive dialog to the analysis system. The channel can be a software application that supports transmission of the dialog and the carrier can be the underlying hardware service supporting the software application. The dialog feedback exchange can involve a question and answer conversation where subsequent questions are presented to the customer in response to a customer answer. This dialog exchange is different than surveys that may be presented in an email or website, where the user answers a list of questions and submits the answers when he or she is done with the survey.

Starting at step 410, interactive content is received from a customer, where the customer is assigned an address. The address can be obtained using an address identification engine (e.g., engine 340) that assigns a unique address to each customer interfacing with the feedback analysis system. The address can be an internally assigned address used exclusively by the feedback analysis system. At step 410, process 400 can determine whether the address is located on a blacklist registry (e.g., blacklist registry 310) or a blocklist registry (e.g., blocklist registry 320). If the determination at step 420 is YES, the interactive content received from the customer is dropped (at step 430). If the determination at step 420 is NO, the interactive content and the address can be evaluated using a bot detection engine (e.g., bot detection engine 330) at step 440. The bot detection engine can access one or more bot detection modules (e.g., modules 331-333) to determine whether the interactive content is associated with a chatbot, as indicated in step 450. If determination at step 450 is that the interactive content is not associated with a chatbot, process 400 may enable further processing of the interactive content, as indicated by step 460. Further processing can include continuing with the dialog, analyzing the interactive content, providing metrics for clients, and any other suitable actions. If the interactive content is determined to be associated with a chatbot at step 450, process 500 can place the address in one of the blacklist registry and the blocklist registry (at step 470) and notify a user (e.g., a client or administrator) that that customer associated with address has been placed in the blacklist registry or the blocklist registry. (as step 480).

It should be understood that the steps shown in FIG. 4 are illustrative and that additional steps may be added, steps may be removed, and the order of the steps may be rearranged.

Figure 5A:
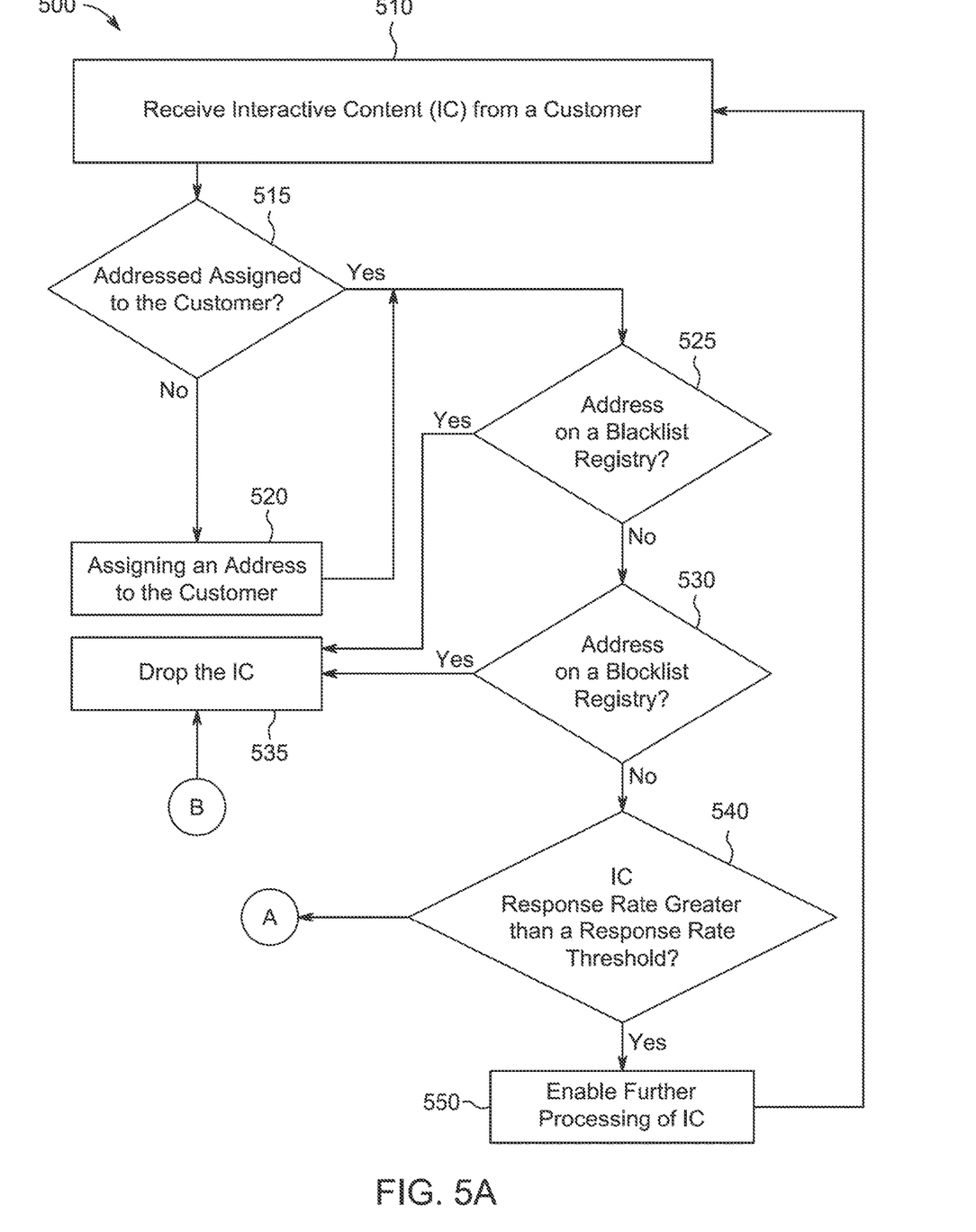
FIGS. 5A and 5B shows another illustrative process for managing chatbot derived interactive content according to an embodiment.
Figure 5B:
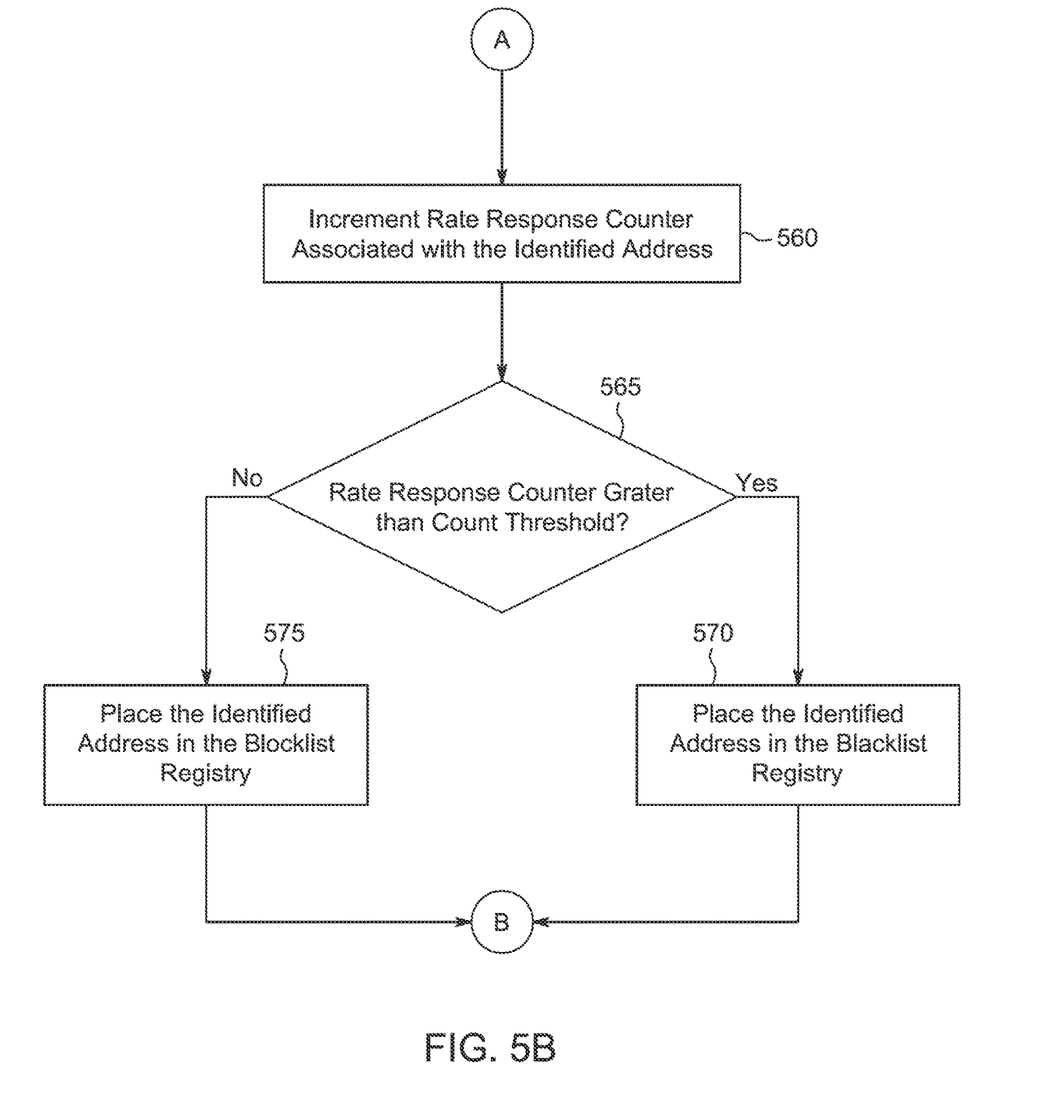

FIGS. 5A and 5B show process 500 for implementing a bot detection module that monitors a response rate to determine whether interactive content is associated with a chatbot according to an embodiment. Part of process 500 may be implemented as step 440 of FIG. 4. Starting at step 510, interactive content can be received from a customer. At step 515, process 500 can determine whether an address is assigned to the customer. If NO, an address can be assigned to the customer at step 520, and process 500 can continue to step 525. If the determination at step 515 is YES, process 500 can determine if the address is on a blacklist registry at step 525. The determination can be made by comparing the address to addresses contained in the blacklist registry. If the determination at step 525 is YES, the interactive content can be dropped at step 535. If the determination at step 525 is NO, process 500 can determine whether the address is on a blocklist registry at step 530. This determination can be made by comparing the address to addresses contained in the blocklist registry. If the determination at step 530 is YES, the interactive content is dropped at step 535.

Figure 5C:
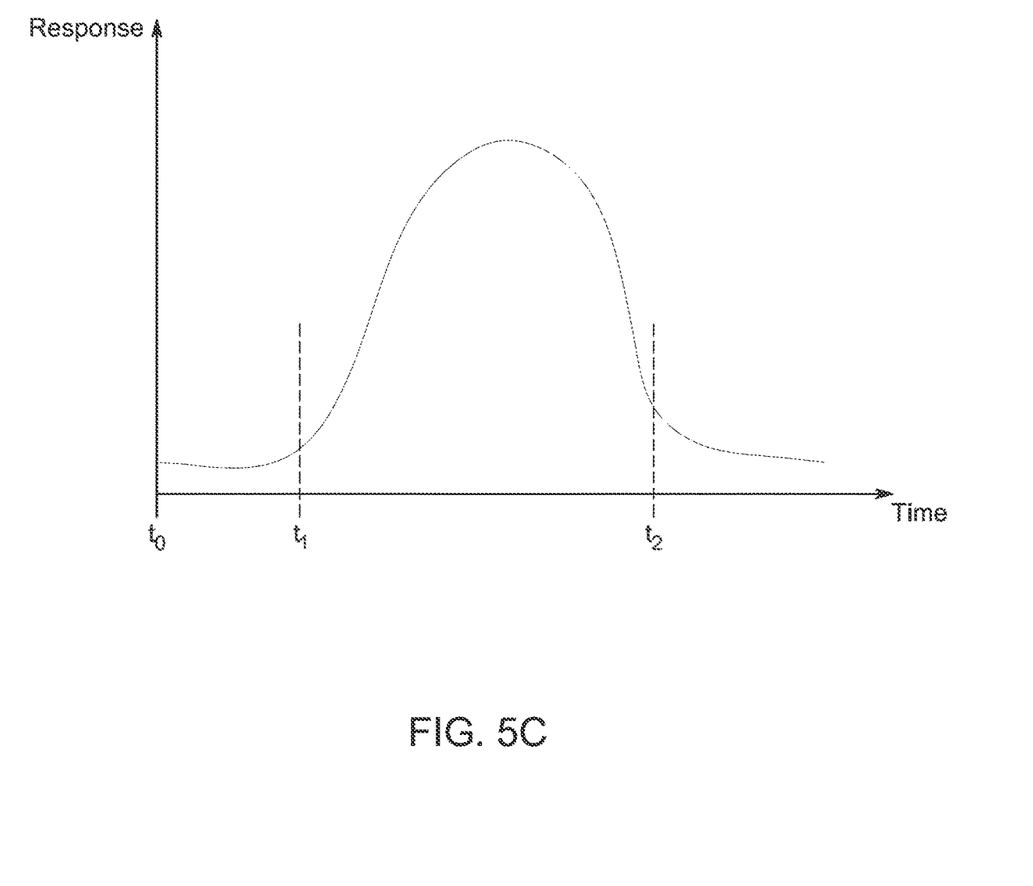
FIG. 5C shows an illustrative distribution graph according to an embodiment.

If the determination at step 530 is NO, process 500 may evaluate whether the interactive content response rate is greater than a response rate threshold at step 540. The response rate refers to the speed at which interactive content is received in response to a query posited in a dialog exchange between the customer and the analysis system. Typically, a human responder takes a longer time to respond to queries than a chatbot responder. Thus, if responses are being received a rate that is less than a response rate threshold, then it may be inferred that a chatbot is responsible for providing the interactive content. FIG. 5C shows an illustrative distribution of interactive content response times, where time, t0, represents the time a question is presented to a customer, the y-axis represents responses, and the x-axis represents time. The response time distribution shown in FIG. 5C shows that a majority of the responses occur between times, t1 and t2. This distribution can be an average of all response times across all users of the analysis system. In this embodiment, time, t1, may represent the response rate threshold that is used to determine whether interactive content is associated with a chatbot or a human. The response rate threshold may be adjusted, for example, via threshold adjustment control 350. For example, as the administrators become more familiar with chatbots and the patterns stemming from their usage, the threshold can be adjusted to reflect those learnings. As another example, multiple different thresholds can be used. As specific example, different threshold may be applied to different channels (e.g., a first threshold for a WeChat, a second threshold for SMS texts, etc.). If responses are received after time, t1, then process 500 may consider the interactive content to be human derived and proceed to step 550 where further processing of the interactive content is enabled. If responses are received between time, t0, and time, t1, then process 500 may consider the response to be chatbot derived and proceed to step 560.

At step 560, a rate response counter associated with identified address can be incremented. The rate response counter may be used to determine whether the identified address should be added to the blacklist registry or the blocklist registry at step 565. If the rate response counter is greater than a count threshold, then that address is added to the blacklist registry at step 570. Use of rate response counter accounts for edge cases where the bot detection engine is not entirely convinced the interactive content is associated with a chatbot. If the same address is routinely beating the response rate threshold, and the counts exceed that count threshold, then that address is deemed a chatbot and added to the blacklist registry. If the counts are below the count threshold, then that address is added to the blocklist at step 575. Following either of steps 570 and 575, the interactive content is dropped at step 535.

It should be understood that the steps shown in FIGS. 5A and 5B are illustrative and that additional steps may be added, steps may be removed, and the order of the steps may be rearranged. For example, additional steps may be added to explain how an address is removed from the blacklist or blocklist registries.

Figure 6:
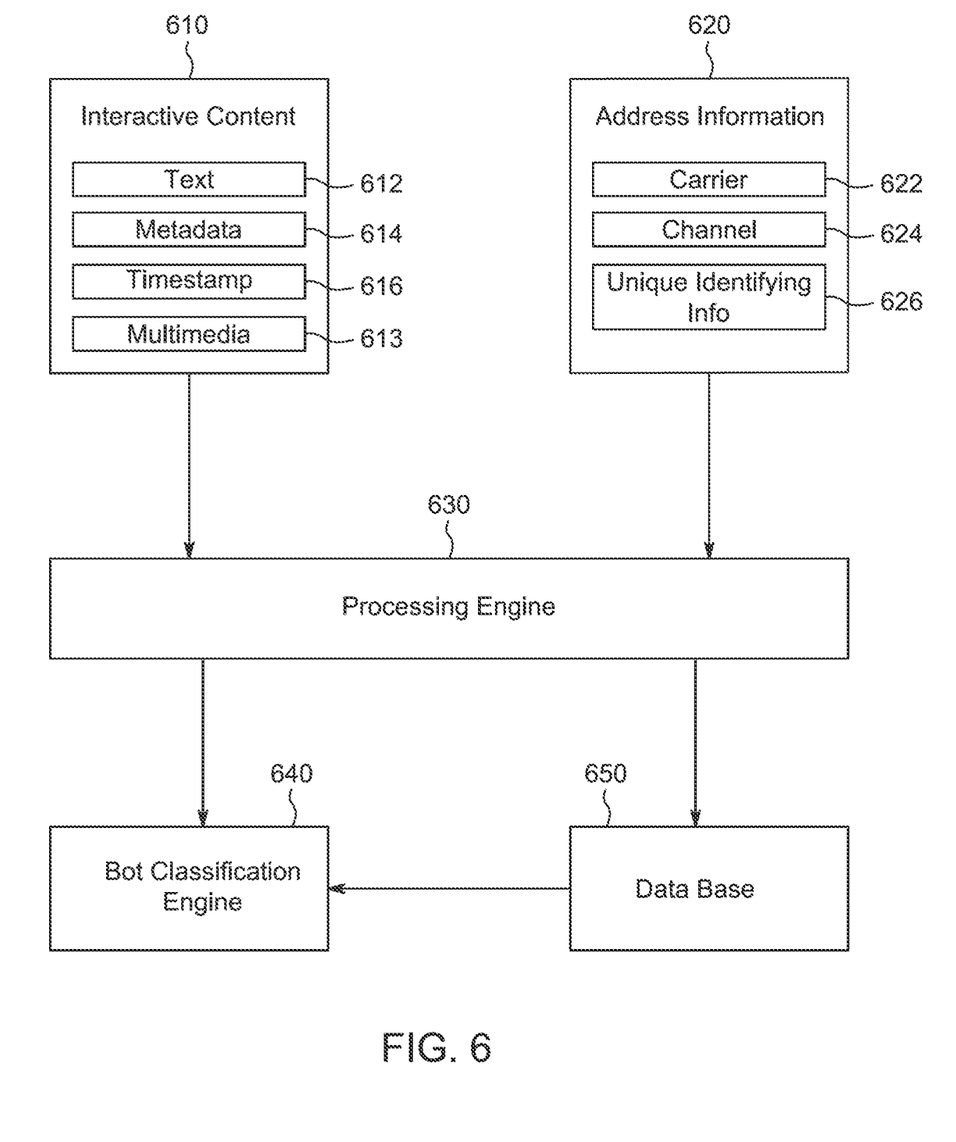
FIG. 6 shows an illustrative block diagram show different components used to implement a bot detection module according to an embodiment.

FIG. 6 shows an illustrative block diagram show different components used to implement a bot detection module according to an embodiment. The bot detection module may be able to evaluate various attributes to assess whether the feedback is associated with a chatbot. The attributes can include interactive content 610 and address information 620. Interactive content 610 can include text 612 of the feedback, multimedia 613, metadata 614, and timestamp 616. Text 612 is self-explanatory and includes the words, characters, syllables, and other symbols such as emojis that make up the dialog. Multimedia 613 can include audio and/or video feedback. Metadata 614 can include information pertaining to the feedback. For example, the metadata can include customer information, application information used by the customer, location, and other similar attribute. Timestamp 616 can be another form a metadata that specifies a time (i.e., date and time) the feedback was transmitted. Address information 620 can include information pertaining to the customer and can include, for example, carrier information 622, channel information 624, and unique identifying information 626. Carrier information 622 can include information related to the carrier (e.g., mobile provider or ISP) responsible for transmitting the feedback. Channel information 622 can include all information related to the platform (e.g., WeChat, Facebook, Twitter, etc.) being used by the customer to transmit feedback. Unique identifying information 626 can include information that is specific to the customer such as a user ID, a handle, password, etc.

Interactive content 610 and address information 620 are provided to processing engine 630. Processing engine 630 is operative to process the feedback data and the address information so that numerical values indicative of the feedback and address information can analyzed by bot classification engine 640. Processing engine 630 may include feature engineering engine, a classification engine, and/or a regression engine. Bot classification engine 640 may analyze the numbers to determine whether the feedback can be attributed to a chatbot. For example, bot classification engine may run cosine vector analysis on the feedback and compare it to other cosine vectors stored in database 650. If the cosine vectors of feedback are similar enough, for example, within a few degrees of each other or less than a fixed threshold, then it can be inferred that the feedback is similar to other feedback, thus indicating that a chatbot is potentially responsible for providing that feedback. Human derived feedback will likely vary and as a result the cosine vectors will exceed a minimum threshold and therefore be deemed human derived feedback. The foregoing example is just one of many different classification approaches that may be used by bot classification engine 640 to assess whether the general characteristics of the feedback can be attributed to a chatbot. Database 650 can maintain pattern tables that are routinely updated and accessed by bot classification engine 640 to perform classification of feedback.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-6, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A computer-implemented method for preventing chatbot derived feedback from being processed by an analysis system, comprising:
    receiving interactive content from a customer as part of a dialog, wherein the dialog comprises at least one question and an answer to each of the at least one question, and wherein the dialog is presented as a conversation thread;
    assigning an address to the customer if an address is not already assigned to the customer;
    dropping the received interactive content if the address is on a blacklist registry or a blocklist registry;
    obtaining a response rate of the received interactive content if the address is not on the blacklist registry or the blocklist registry;
    enabling further processing of the received interactive content if the response rate is greater than a response rate threshold; and
    if the response rate is less than the response rate threshold:
        placing the address in the blacklist registry if a response rate counter associated with the address is greater than a count threshold; and
        placing the address in the blocklist registry if the response rate counter is less than or equal to the count threshold.

2. The computer-implemented method of claim 1, further comprising incrementing the response rate counter if the response rate is less than the response rate threshold.

3. The computer-implemented method of claim 1, wherein the response rate represents an elapsed time between presentation of a question in the dialog and an answer thereto.

4. The computer-implemented method of claim 1, wherein the response rate threshold is based on a distribution of average feedback response times processed by the analysis system.

5. The computer-implemented method of claim 1, wherein the response rate threshold is selected based on an average minimum time required for humans to respond to questions presented in the dialog.

6. The computer-implemented method of claim 1, wherein the blacklist registry contains addresses for which associated received interactive content is permanently dropped.

7. The computer-implemented method of claim 1, wherein the blocklist registry contains address for which associated received interactive content is temporarily dropped.

8. A computer-implemented method for preventing chatbot derived feedback from being processed by an analysis system, comprising:

receiving interactive content from a user via an electronic device, wherein the interactive content includes answers by the user to a series of questions rendered to the user;

dropping the received interactive content if an address associated with the user is on a blacklist registry or a blocklist registry;

obtaining a response rate of the received interactive content if the address is not on the blacklist registry or the blocklist registry; and     placing the address associated with the user on the blacklist registry or the blocklist registry if the response rate is less than a response rate threshold.

9. The computer-implemented method of claim 8, wherein the address is placed on the blacklist registry if the response rate counter associated with the address is less than a response rate threshold and greater than a count threshold.

10. The computer-implemented method of claim 9, wherein the address is placed on the blocklist registry if the response rate counter is less than or equal to the count threshold.

11. The computer-implemented method of claim 8 further comprising enabling further processing of the received interactive content if the response rate is greater than the response rate threshold.

12. The computer-implemented method of claim 8 further comprising assigning an address to the user if an address is not already assigned to the customer.

* * * * *